(12) United States Patent
Butler

(10) Patent No.: US 7,654,030 B2
(45) Date of Patent: Feb. 2, 2010

(54) RABBIT EAR NO-GAFF SPEAR

(75) Inventor: Ramion Clayton Butler, 7413 Ave. M, Santa Fe, TX (US) 77510

(73) Assignee: Ramion Clayton Butler, Santa Fe, TX (US)

( * ) Notice: Subject to any disclaimer, the term of this patent is extended or adjusted under 35 U.S.C. 154(b) by 95 days.

(21) Appl. No.: 11/789,336

(22) Filed: Apr. 24, 2007

(65) Prior Publication Data

US 2008/0263931 A1   Oct. 30, 2008

(51) Int. Cl.
*A01K 81/04* (2006.01)
(52) U.S. Cl. .................................. 43/4.5; 43/6
(58) Field of Classification Search ............ 43/5, 43/6, 4.5; D22/134, 149; 294/19.3, 26, 66.1
See application file for complete search history.

(56) References Cited

U.S. PATENT DOCUMENTS

| | | | | |
|---|---|---|---|---|
| 206,694 | A * | 8/1878 | Taylor | 43/6 |
| 1,403,550 | A * | 1/1922 | Hinsdale | 43/6 |
| 2,236,427 | A * | 3/1941 | Garrison | 43/6 |
| 2,708,860 | A * | 5/1955 | Arpin | 89/1.34 |
| 2,745,204 | A * | 5/1956 | Myers | 43/6 |
| 2,753,643 | A * | 7/1956 | Recker | 43/6 |
| 2,758,405 | A * | 8/1956 | Hertel | 43/6 |
| 2,770,905 | A * | 11/1956 | Efraimson | 43/6 |
| 2,796,691 | A * | 6/1957 | Norris | 43/6 |
| 2,951,306 | A * | 9/1960 | Woodfield | 43/6 |
| 2,963,811 | A * | 12/1960 | Nelson | 43/6 |
| 3,050,897 | A * | 8/1962 | Pitts | 43/6 |
| 3,071,883 | A * | 1/1963 | Merz | 43/6 |
| 4,624,068 | A * | 11/1986 | Howard, III | 43/6 |
| 4,819,360 | A * | 4/1989 | Thomas | 43/6 |
| 4,839,979 | A * | 6/1989 | Rogers | 43/6 |
| 4,896,450 | A * | 1/1990 | Rogers | 43/6 |
| 5,243,778 | A * | 9/1993 | Henley | 43/6 |
| 2006/0042144 | A1* | 3/2006 | Rogers | 43/6 |

* cited by examiner

*Primary Examiner*—Kurt Rowan

(57) ABSTRACT

The present invention includes a spear tip that is removably mounted onto the upper end of a spear shaft, which is securely engaged upon the upper end of a handle. A rubber band secures the spear tip to the upper end of the spear shaft. Spear tip has a conical portion integrally formed upon the top of a cylindrical portion. A cable is fixed to the spear point by passing the end of cable through a transverse passageway formed through the cylindrical portion below conical portion and forming a loop at the end of the cable. A pair of parallel rabbit ears is affixed to opposing sides of the cylindrical portion. The cable is adapted with a quick connect/disconnect mechanism.

6 Claims, 5 Drawing Sheets

RABBIT EAR NO-GAFF SPEAR

BACKGROUND

This invention relates to gaff fishing spears. The sport of spear fishing is well known in the art. The use of fishing spears is also well known in the art. Normally, a gaff-fishing pole is a pole with a hook on the end that is used to pierce a large fish so that it can be lifted onto a boat.

One example of such is a spear is U.S. Pat. No. 5,243,778. However, the present invention is a new novel design of a gaff fishing spear.

SUMMARY

One of the main objectives of the present invention is to provide an improved simple gaff fishing spear that has structural integrity to support sports fishing. Another feature of the gaff-fishing spear is that the handle is not used to bring the fish onto the boat.

The present invention includes a spear tip that is removably mounted onto the upper end of a spear shaft, which is securely engaged upon the upper end of a handle. A rubber band secures the spear tip to the upper end of the spear shaft. Spear tip has a conical portion integrally formed upon the top of a cylindrical portion. A cable is fixed to the spear point by passing the end of cable through a transverse passageway formed through the cylindrical portion below conical portion and forming a loop at the end of the cable. A pair of parallel rabbit ears is affixed to opposing sides of the cylindrical portion. The cable is adapted with a quick connect/disconnect mechanism.

The foregoing and other features of the present invention will become more apparent from the following description and accompanying drawings.

DRAWINGS

FIG. 2B-1 shows a view of the fishing spear being used to land a fish by users in a boat.

DETAILED DESCRIPTION

Figure 1A:
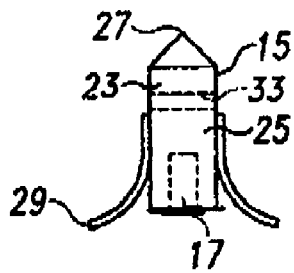
FIG. 1A is a frontal view of the fishing spear of the present invention with spear point removed.

Referring to FIG. 1A there is shown, the fishing spear 10 generally illustrated by reference numeral 10 depicting spear point 15 removed from spear shaft 20. The diameter of the upper end 21 of the spear shaft 20 is slightly reduced and sized to accommodate the removable spear point 15. The lower end of the spear point 15 carries a recess 17 having a diameter that compliments the diameter of the upper end 21 of the spear shaft 20. In use, upper end 21 removeably inserts into recess 17.

Figure 1B:
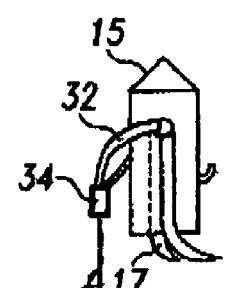
FIG. 1B is a frontal enlarged view of the spear point.
Figure 1C:
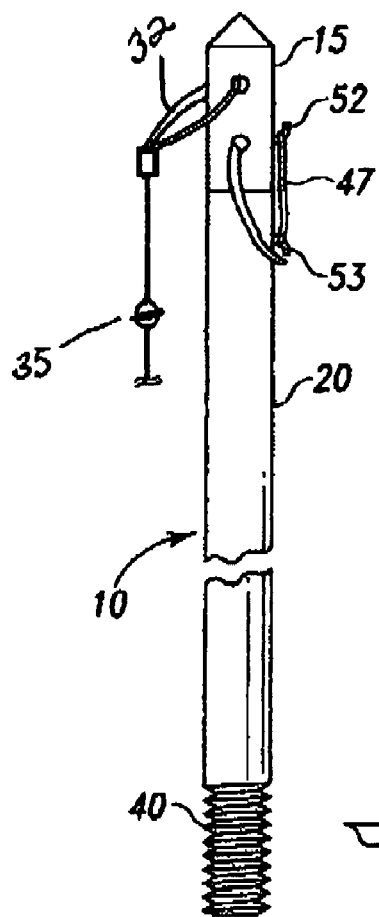
FIG. 1C is a side view of the fishing spear with the spear point inserted upon spear shaft.

Referring to FIG. 1B there is shown an exploded view of spear point 15. Spear point 15 further comprises a cylindrical portion 25 with an integrally formed conical shape 23 top portion terminating in a triangular shaped apex point 27. A pair of opposing rabbit ears 29 and 30 is affixed to the lower end of spear point 15 on opposing sides of cylindrical portion 25. Each rabbit ear 29 and 30 curves slightly upward therefrom.

Cable 32 is fixed to the spear point 15 by passing the end of cable 32 through a transverse conduit 33 formed through the cylindrical portion 25 below conical portion 23 and forming a loop at the end of the cable 32. The loop is formed in a well-known manner by, a collar 34. The cable 32 further extends downward terminating in a quick release connector device 35. Connector device 35 is conventional device. Rope 41 is tethered to cable 32 by a connector device 35. Connector device 35 is attached to the one end of the rope 41 and is adapted to quickly connect and disconnect from connector device 43. Then, other end of the rope 41 is attached to the craft of the boat as shown in FIG. 1D.

Rubber band 47 is used to secure spear point is to spear shaft 20. A pair of hooks 52 and 53 is affixed to the outer surface area of pole 10. One of the hooks 52 is affixed at an intermediate position on the outer surface of spear point 15. Hook 53 is affixed to the upper end of the outer surface of spear shaft 20 and is aligned in a position directly beneath hook 52. In use, rubber band 47 connects hooks 52 and 53 together securing spear point 15 to spear shaft 20.

Figure 1D:
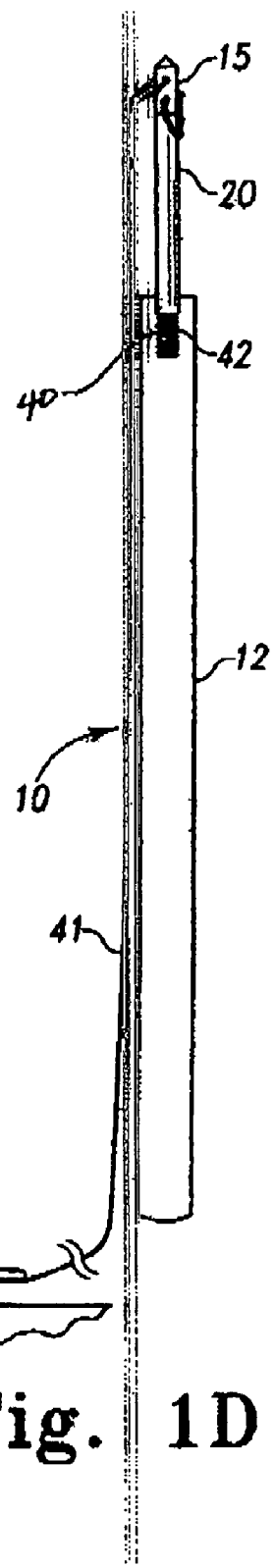
FIG. 1D is a side view of the fishing spear.

Referring to FIG. 1D, the fishing spear 10 further comprises a cylindrical handle 12 removable attached at one end to a spear shaft 20. The upper-end of handle 12 has internal threads formed within a bore 42 to cooperatively engage with the threaded insert fitted onto the distal end 40 of spear shaft 20.

Figure 2A:
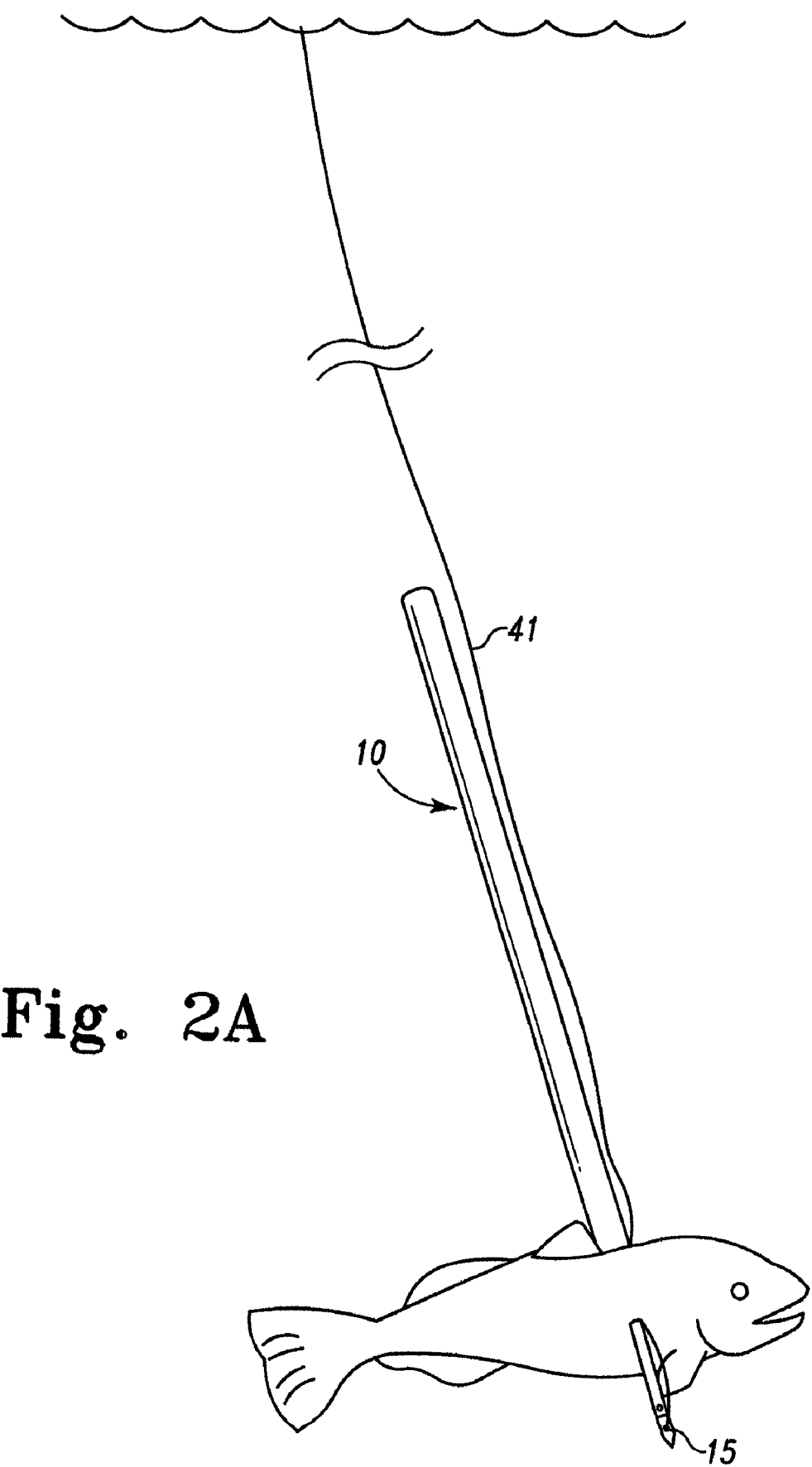
FIG. 2A is a side view of the fishing spear with the spear point speared into, a fish.
Figure 2B:
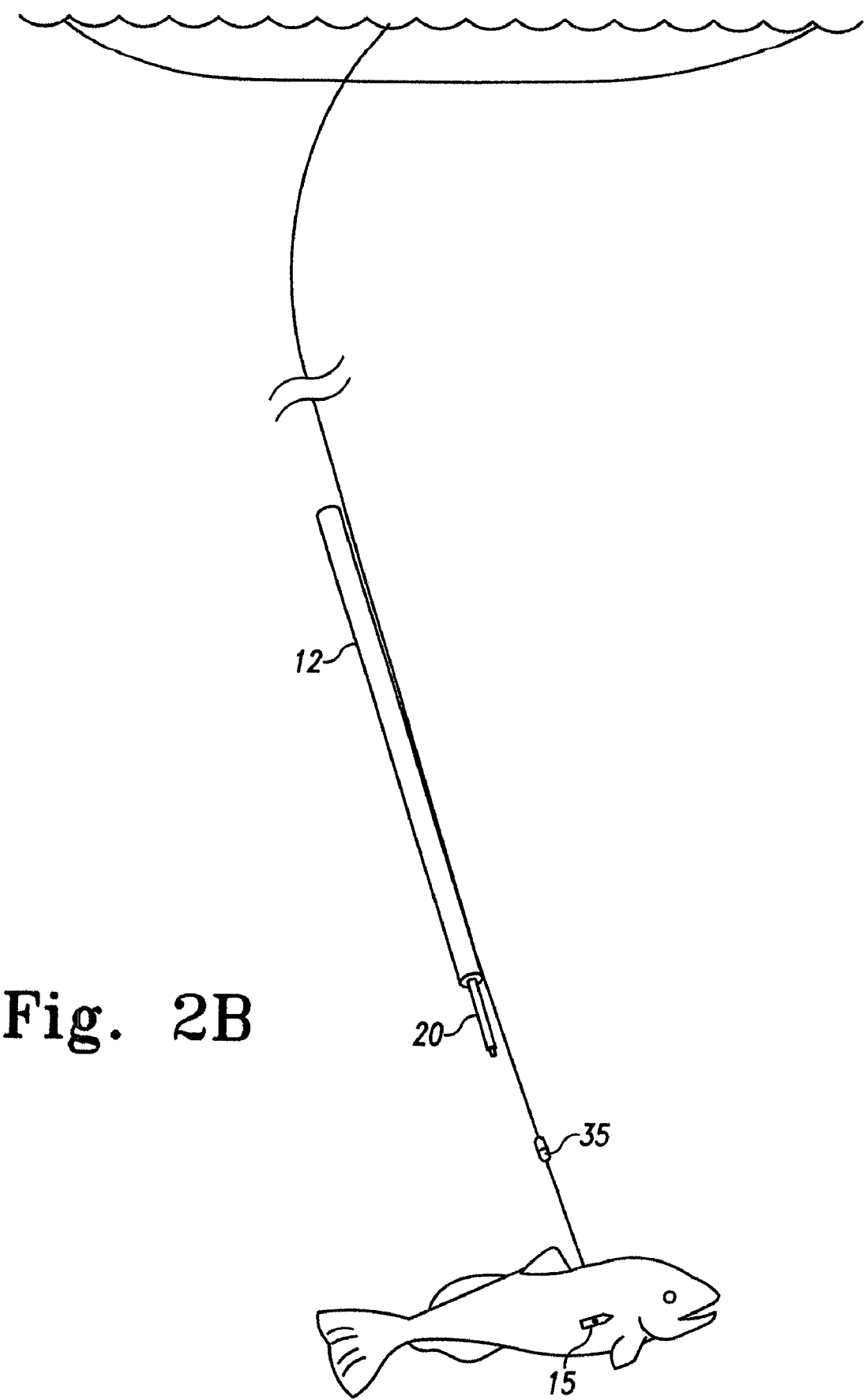
FIG. 2B is a side view of the fishing spear with the spear point pivoted to its retaining position within the fish.
Figures 1, 2B:
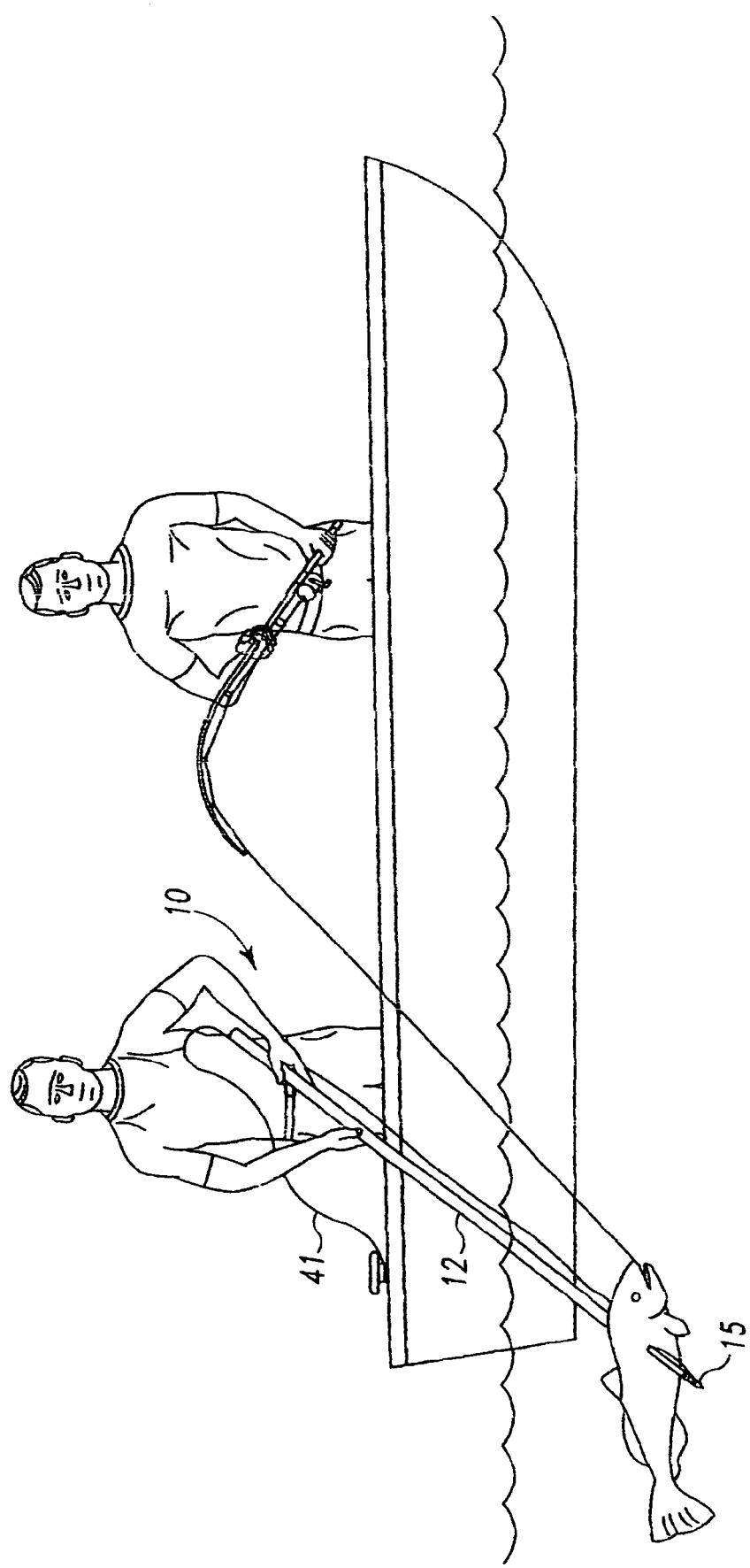
Figure 2C:
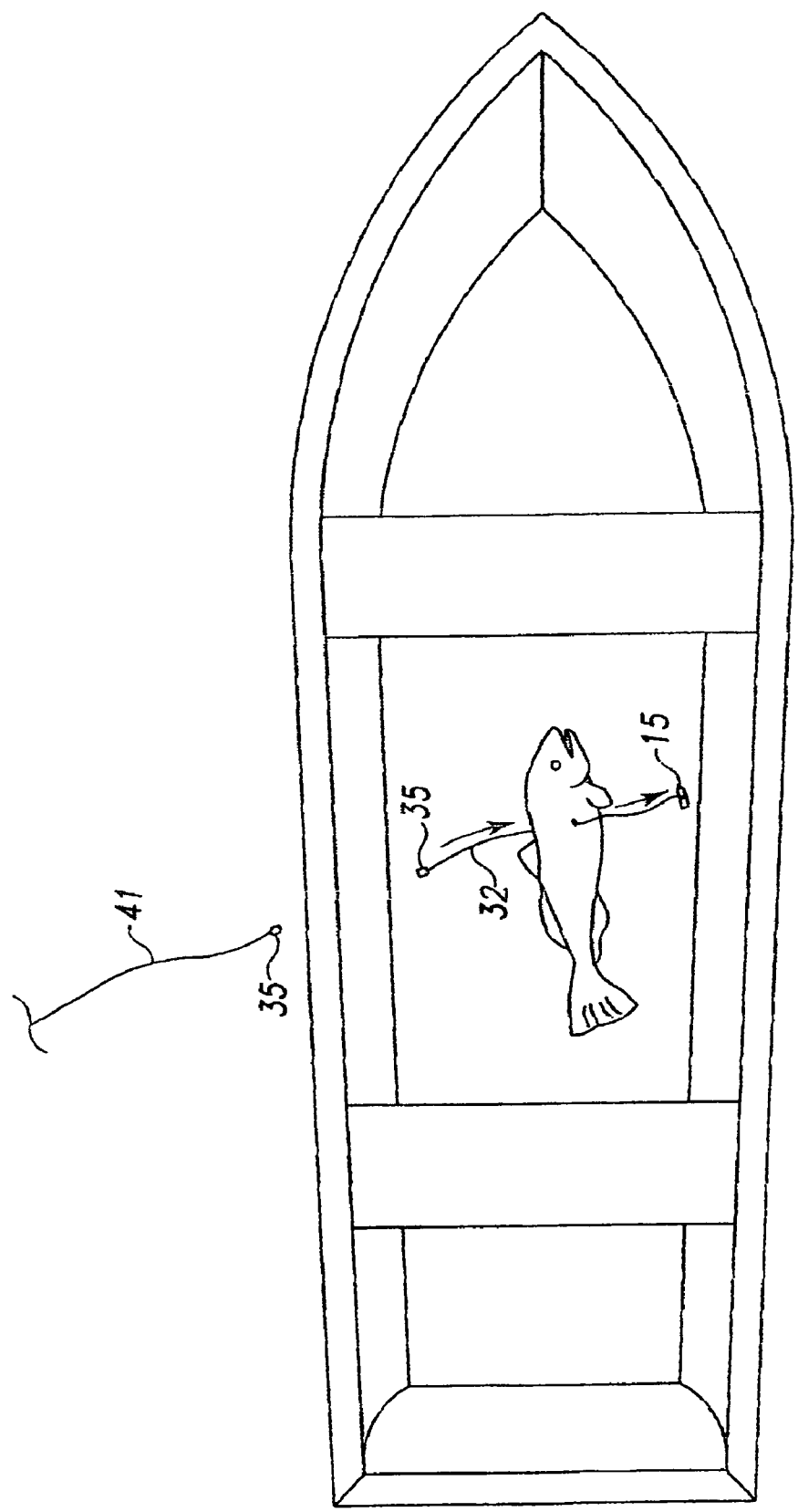
FIG. 2C is a side view of the fishing spear with the spear point pivoted to its removal position with the cable disconnected so that the cable is removed through the wound of the fish after being brought aboard the vessel.

In use, as shown in FIG. 2A, spear point 15 along with the spear shaft 20 and cable 32 is propelled through the body of the fish. Once the body of the fish is speared the spear shaft 20 is withdrawn. As the spear shaft is withdrawn, rubber 47 breaks dislodging the spear point from the spear shaft, which exerts force upon the rabbit ears 29 and 30 attached to spear point 15. The force exerted upon the rabbit ears 29 and 30 cause the spear point 15 to rotate 90 degrees as shown in FIG. 2B and 2C. Then, the rope 41 is used to pull the fish onto the boat. To remove the spear point 15 from the fish the cable is disconnected from the rope. To remove the spear point, from the body of the fish the cable 32 is disconnected at connector device 35 is removed from the spear point 15 and pulled through the wound of the fish by pulling on spear point 15.

What is claimed is:

1. A fishing spear assembly:
    a spear point having a cylindrical bottom portion with an integrally formed conical shape top
    portion terminating in an apex point;
        a pair of opposing retaining ears affixed on opposing sides of the cylindrical bottom portion at each lower end;
            each retaining ear curving slightly outwardly therefrom;
            a transverse conduit formed through the cylindrical bottom portion below the conical portion;
    a cable affixed to the spear point by passing a first end of cable through the transverse conduit and connecting the first end of the cable to second end of the cable wherein a loop is formed;

an elongated spear shaft having an upper end with a slightly reduced diameter sized; the upper end adapted to releasably engage with a recess formed within the bottom portion of the spear point;

the recess having a diameter complementing the diameter of the upper end of the spear shaft;

a first and a second hook with the first hook affixed at an intermediate position on the outer surface of spear point and the second hook affixed to the-upper end of an external surface area of the spear shaft, the second hook—being situated directly below the first hook; and a fastening means releasably attaching the first and second hook wherein the spear point is releasably attached to the spear shaft.

2. The assembly of claim 1 wherein the spear shaft further comprises a second fastening means affixed to a lower edge of the spear shaft wherein the spear shaft can be releasably engaged with an elongated handle.

3. The assembly of claim 1 wherein the fastening means is a rubber band.

4. The assembly of claim 1 further comprising:

the cable extending linearly downward from the loop to a third end;

a disconnect mechanism attached to the third end of the cable; and the disconnect mechanism releasably connecting the cable from the rope.

5. The assembly of claim 1 wherein the recess and the upper end of the shaft are adapted with cooperating threads for releasably connecting the shaft to the spear point.

6. A method of using a fishing spear assembly specifically adapted for spear fishing, the method comprising:

providing the fishing spear assembly of claim 1;

releasably connecting the lower end of the spear point to the upper end of the spear shaft releasably connecting the cable to a rope;

releasably connecting the spear shaft to a handle wherein the rope lies parallel to the handle and the shaft wherein the fishing spear assembly is formed;

piercing the fishing assembly through a body of a fish; and withdrawing the handle connecting with the shaft from the body of the fish causing the spear point to disconnect from the spear shaft and thereby causing the spear point to rotate 90 degrees.

\* \* \* \* \*